United States Patent [19]

Parry

[11] Patent Number: 5,406,554
[45] Date of Patent: Apr. 11, 1995

[54] SYNCHRONOUS FIFO HAVING AN ALTERABLE BUFFER STORE

[75] Inventor: Raymond E. Parry, Colorado Springs, Colo.

[73] Assignee: Music Semiconductors, Corp., Colorado Springs, Colo.

[21] Appl. No.: 132,101

[22] Filed: Oct. 5, 1993

[51] Int. Cl.6 ............................................. H04Q 11/04
[52] U.S. Cl. .................... 370/58.1; 370/58.2; 370/85.9; 370/85.13; 365/189.01; 365/189.04; 365/189.08
[58] Field of Search .................... 370/79, 60, 61, 58.1, 370/58.2, 58.3, 85.9, 85.13; 365/189.01, 189.02, 189.04, 189.05, 189.08, 230.02, 230.03

[56] References Cited

U.S. PATENT DOCUMENTS

| | | | |
|---|---|---|---|
| 4,541,076 | 9/1985 | Bowers et al. | 365/190 |
| 4,718,043 | 1/1988 | Akatsuka | 368/227 |
| 4,789,967 | 12/1988 | Liou et al. | 365/189 |
| 4,809,166 | 2/1989 | Cooper | 364/200 |
| 4,835,733 | 5/1989 | Powell | 364/900 |
| 4,847,812 | 7/1989 | Lodhi | 365/221 |
| 4,882,709 | 11/1989 | Wyland | 365/189.02 |
| 4,890,280 | 12/1989 | Hirata | 370/60 |
| 4,891,788 | 1/1990 | Kreifels | 365/189.01 |
| 4,908,796 | 3/1990 | Lee et al. | 365/189.05 |
| 4,992,983 | 2/1991 | Suzuki | 365/189.05 |
| 5,058,076 | 10/1991 | Kluchi | 365/230.01 |
| 5,072,138 | 12/1991 | Slemmer et al. | 307/465 |
| 5,079,693 | 1/1992 | Miller | 395/250 |
| 5,099,481 | 3/1992 | Miller | 371/22.1 |
| 5,117,429 | 5/1992 | Lagoutte | 370/60 |
| 5,121,346 | 6/1992 | McClure | 364/550 |
| 5,134,586 | 7/1992 | Steele | 365/201 |
| 5,305,253 | 4/1994 | Ward | 365/189.01 |
| 5,311,475 | 5/1994 | Huang | 365/189.01 |

Primary Examiner—Douglas W. Olms
Assistant Examiner—Russell W. Blum
Attorney, Agent, or Firm—William J. Kubida; Holland & Hart

[57] ABSTRACT

A synchronous first-in, first-out ("FIFO") having an alterable buffer store includes a dual-ported, random access memory ("RAM") based memory device incorporating conventional "empty" and "full" flags while also providing an alternate mode of operation in which the inhibiting effects of the "empty" and "full" flags are disabled whereby information contained within the FIFO may be modified before being read out. The alternate mode of operation is particularly useful in asynchronous transfer mode ("ATM") networking applications.

8 Claims, 4 Drawing Sheets

Fig_1

Fig.-2

Fig_3

Fig_4

SYNCHRONOUS FIFO HAVING AN ALTERABLE BUFFER STORE

BACKGROUND OF THE INVENTION

The present invention relates, in general, to a synchronous first-in, first-out ("FIFO") having an alterable buffer store. More particularly, the present invention relates to a dual-ported, random access memory ("RAM") based memory device incorporating conventional "empty" and "full" flags and an alternate mode of operation which disables the inhibiting effects of the "empty" and "full" flags for effective use in alterable buffer store applications whereby information contained within the FIFO may be modified before being read out. The alternate mode of operation is particularly useful in asynchronous transfer mode ("ATM") networking applications.

FIFOs are integrated circuit ("IC") devices which integrate a memory array, such as dual-ported memory, with associated on-chip logic which may be utilized in a wide variety of data buffering applications such as graphics, disk controllers and communication networks. A FIFO memory's function allows quick write and read bursts to minimize the time spent by a central processing unit ("CPU") when communicating with slower circuit elements thereby allowing the highest performance on the computer bus. FIFO's may also be used to enhance the throughput of time-critical systems developed for digital signal processing ("DSP"). Typical applications may involve allowing high speed throughput between DSP's in pipelined and parallel applications, supporting communications between a DSP and a host processor and buffering data between mismatched processor speeds and the buses. Typically, FIFO buffer memories allow the matching of multiple asynchronous systems whereby one system is operating at a significantly different clock frequency than another in order that data from one system may be temporarily stored before being read out for processing. Characteristically, the length of the FIFO is determined by the difference in clock rates and the amount of data to be buffered. When utilizing a dual-ported RAM, conventional FIFOs allow simultaneous access to the memory through two independent "write" and "read" ports. Since the data is always contiguous, an address bus is not needed and data is read out in the same order in which it was received.

In a synchronous FIFO, data may be clocked into and out of registers which buffer the actual memory array, so that shorter data setup and hold times are possible than with asynchronous FIFOs. Synchronous FIFOs also provide easier integration into synchronous systems. Writing and reading operations are controlled by "write" and "read" enables, while the "write" and "read" clocks may be either the same or different frequencies or have differing phase relationships.

In conventional FIFO design, four "flags" are provided to give the user information on the status of the memory array. In dual-ported RAM arrays, dedicated write and read address pointers are utilized, and the flag logic prevents illogical writes and reads from occurring. The "empty" flag indicates that the read and write cycle counts are equal, and will be automatically asserted after a reset, which functions to reset the cycle counters and returns both read and write pointers to memory address zero. The empty flag, therefore, prevents reading while empty, a data underflow condition. As a result, if the memory array is empty, a read cycle is inhibited until at least one data entry has been written.

On the other hand, a "full" flag indicates that the write and read counts are at a maximum distance apart, which implies that a full load of data has been written to the FIFO and has not yet been read out. The full flag, therefore, prevents writing while full, a data overflow condition. If the memory array is full, a write cycle is inhibited until at least one data entry has been read out. Once data that has been stored at a given address is read, it can then be overwritten. In such conventional FIFO operation, as long as the read pointer is advancing due to read cycles, the write pointer will "wrap around," continuing past the last memory address and beginning again at the first memory address until the difference between the write and read counters indicate that the FIFO is full. Therefore, the flag status of the FIFO is a function of the difference between the pointers and not their absolute value. Resetting the FIFO simply initializes the address pointers to address zero.

The other pair of "flags" are conventionally known as programmable "almost empty" and programmable "almost full" flags which are user programmable to provide a preset offset before the empty and full conditions are reached to provide early warning to the user of approaching states of fullness or emptiness. In conventional FIFOs, multiple write enables and read enables are provided to be utilized at reset times to configure the FIFO for programmable flags.

SUMMARY OF THE INVENTION

Provided herein is a synchronous FIFO having a conventional mode of operation as well as an alternate mode of operation in which the inhibiting effects of the empty and full flags may be disabled for effective use in alterable buffer store applications, such as ATM networking. In use as an alterable buffer store, selected information contained within the FIFO may be modified before being read out. Use of this alternate mode of operation is of particular utility in ATM networking where data is of a fixed size and the first few bytes of the stored data, which may represent address values and cyclical redundancy check ("CRC") code, may be modified after a table lookup is performed prior to being retransmitted.

What has been provided, therefore, is a first-in, first-out memory device including a memory array where the device has input and output registers thereof respectively coupling an input data bus and output data bus of the device to the memory array. The first-in, first-out memory device includes write control logic responsive to a write enable signal for transferring data on the input data bus to the input register for writing to a first predetermined location in the memory array. A corresponding read control logic is responsive to a read enable signal for transferring data from a second predetermined location in the memory array to the output register for reading on the output data bus. Flag logic is responsive to the write control logic and the read control logic for indicating when the memory array is full or empty. First means are provided for inhibiting the write control logic and the read control logic in response to a respective full or empty indication from the flag logic and second means are provided for enabling the write control logic and the read control logic despite the respective full or empty indication from the flag logic.

Further provided herein is a data switching system for coupling an input data bus to an output data bus wherein the system includes a plurality of memory devices in which data may be selectively modified in any of the devices. The data switching system comprises a first memory device coupled to the input data bus for writing in input data to a first memory array. A second memory device is coupled to a modification data bus for overwriting selected data in the second memory array with modified data. A third memory device is coupled to the output data bus for reading out output data from a third memory array to the output data bus. The data switching system may also incorporate a multiplexer system which selectively couples the input and modification data buses to the first, second and third memory devices. The multiplexer system couples the input data bus and the modification data bus to the first and second memory devices respectively at a first predetermined time, to the third and first memory devices respectively at a second predetermined time and to the second and third memory devices respectively at a third predetermined time.

Further provided is a method for data switching between an input data bus and an output data bus which comprises the steps of writing in data from the input data bus to a first memory device, modifying data in a second memory device and reading out data from a third memory device to the output data bus. The data switching method of the present invention may further include the steps of secondly modifying data in the first memory device, secondly reading out data from the second memory device to the output data bus and secondly writing in data from the input data bus to the third memory device. In accordance with a further method of the present invention, the data switching method may further include the steps of thirdly reading out data from the first memory device to the output data bus, thirdly writing in data from the input data bus to the second memory device and thirdly modifying data in the third memory device.

BRIEF DESCRIPTION OF THE DRAWINGS

The aforementioned and other features and objects of the present invention and the manner of attaining them will become more apparent, and the invention itself will be best understood by reference to the following description of a preferred embodiment taken in conjunction with the accompanying drawings, where.

DESCRIPTION OF A PREFERRED EMBODIMENT

Figure 1:
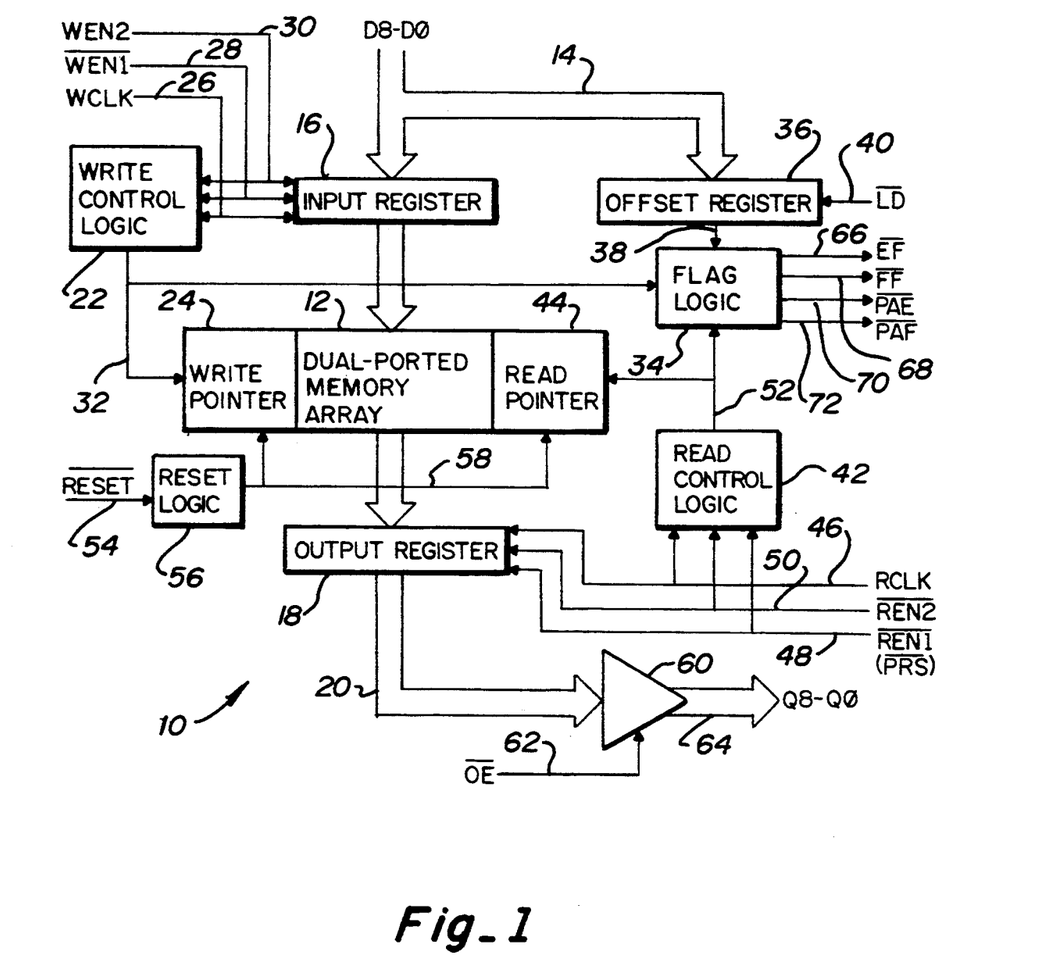
FIG. 1 is a simplified, logic block diagram of a synchronous FIFO in accordance with the present invention which may be utilized, in an alternate mode of operation, as an alterable buffer store in which information contained within the FIFO may be modified before being read out.

With reference now to FIG. 1, a first-in, first-out dual-ported memory ("FIFO") 10 is shown. In the embodiment shown, FIFO 10 is described with respect to a synchronous or "clocked" programmable device although the use of the present invention with other types of FIFO's is contemplated. The core of FIFO 10 is a dual-ported complementary metal oxide semiconductor ("CMOS") random access memory ("RAM") designated as memory array 12.

FIFO 10 couples an input data bus 14, comprising, for example, a number of data lines D0–D8, to an internal input register 16. Data input to FIFO 10 on input data bus 14 is read into memory array 12 by means of input register 16. Input register 16, in conjunction with write control logic 22 receives as input a signal on write clock ("WCLK") line 26, write enable 1 ("$\overline{\text{WEN1}}$") line 28 and write enable 2 ("WEN2") line 30. Output of write control logic 22 includes a write logic signal line 32 for input to write pointer 24 and flag logic 34.

Input data bus 14 is also coupled to offset register 36 having a load ("$\overline{\text{LD}}$") line 40 input for providing an offset signal 38 to flag logic 34. LD line 40 may be tied to WEN2 line 30 and collectively may be referred to as WEN2/$\overline{\text{LD}}$ line 30. Additionally, a reset input ("$\overline{\text{RESET}}$") 54 is applied to reset logic 56 generating a reset signal on reset signal line 58 for input to write pointer 24 and read pointer 44.

Data previously written into memory array 12 may be read out by means of output register 18 coupled to internal output bus 20. Internal output bus 20 is coupled to output data bus 64 comprising, for example, output lines Q0–Q8, through output buffer 60 as controlled by an output enable ("$\overline{\text{OE}}$") line 62. Output register 18 also receives as input a read clock ("RCLK") line 46, a read enable 1/pointer reset ("$\overline{\text{REN1}}/\overline{\text{PRS}}$") line 48 and a read enable 2 ("$\overline{\text{REN2}}$") line 50 which are also supplied as input to read control logic 42. Read control logic 42 supplies a read logic signal on read logic signal line 52 to flag logic 34 and read pointer 44.

Flag logic 34 supplies as outputs of FIFO 10, signals on empty flag ("$\overline{\text{EF}}$") line 66, full flag ("$\overline{\text{FF}}$") line 68, programmable almost empty flag ("$\overline{\text{PAE}}$") line 70 and programmable almost full flag ("$\overline{\text{PAF}}$") line 72.

FIFO 10 comprises a storage device that allows data to be read from memory array 12 in the same order in which it is written. Nine pins of the integrated circuit comprising FIFO 10 are used for data input (D0–D8) to input data bus 14 and 9 pins are used for data output (Q0–Q8) on output data bus 64. There are separate clocks for both the write and read functions and dual enables for each clock. One of the write and read enables serve multiple functions and are used to set up the FIFO 10 configuration. There is a $\overline{\text{RESET}}$ 54 line to reset FIFO 10 and an output enable ("$\overline{\text{OE}}$") 62 that can be used to put the data output pins into a three-state mode. An empty flag signal on $\overline{\text{EF}}$ line 66 indicates when the read and write cycle counts are equal, and normally inhibits the ability to read from FIFO 10. The full flag signal appearing on $\overline{\text{FF}}$ line 68 indicates when the read and write cycle counts are separated by a value equal to the size of the memory array 12 of FIFO 10 and normally inhibits the ability to write to a device. The almost empty and almost full flags appearing on $\overline{\text{PAE}}$ line 70 and $\overline{PAF}$ line 72 respectively are programmable as to their assertion offset from the empty and full flags. In an alternate mode of operation as will be more fully described hereinafter, the inhibiting effects of the empty and full flags appearing on $\overline{EF}$ line 66 and $\overline{FF}$ line 68 respectively can be disabled.

In the embodiment of FIFO 10 described and shown, positive logic is used in the following descriptions of the pin functions. A logic "low" corresponds to Boolean logic "0." A logic high corresponds to a Boolean "1."

D8–D0

The input data on pins D8–D0 of input data bus 14 are registered into the input register 16 by the rising edge of WCLK on WCLK line 26 when the write enable(s) on $\overline{WEN1}$ line 28 and WEN2/$\overline{LD}$ line 30 are asserted, and the memory array 12 is not full (in normal operation). The data is then transferred to the location in memory array 12 pointed to by the write pointer 24. When configured for programmable flags, the data array 12 on pins D7–D0 of input data bus 14 is loaded into the offset register 36 on the rising edge of WCLK on WCLK line 26 when both $\overline{WEN1}$ on $\overline{WEN1}$ line 28 and WEN2/$\overline{LD}$ on WEN2/$\overline{LD}$ line 30 is low. In the alternate mode, the state of $\overline{FF}$ on $\overline{FF}$ line 68 does not affect the ability to write into the input register 16.

$\overline{RESET}$

When $\overline{RESET}$ on $\overline{RESET}$ line 54 is taken low, the internal read and write pointers 44, 24 are set to the first location of the memory array 12, the output register 18 is set to all zeroes, and the offset register 36 is set to the default value of seven. The read and write cycle counters are reset, which causes the empty $\overline{EF}$ and almost empty $\overline{PAE}$ flags on $\overline{EF}$ line 66 and $\overline{PAE}$ line 70 to go low, and the full $\overline{FF}$ and almost full $\overline{PAF}$ flags to go high on $\overline{FF}$ line 68 and $\overline{PAF}$ line 72. Holding WEN2/$\overline{LD}$ on WEN2/$\overline{LD}$ line 30 low when $\overline{RESET}$ goes low on $\overline{RESET}$ line 54 will put the device in the programmable flag mode of operation. Holding $\overline{REN1}$ low on $\overline{REN1}$ /$\overline{PRS}$ line 48 when $\overline{RESET}$ goes low on $\overline{RESET}$ line 54 will put the device in the alternate mode of operation where the inhibiting effect of the flags is disabled and $\overline{REN1}$ becomes $\overline{PRS}$, a pointer reset on $\overline{REN1}$/$\overline{PRS}$ line 48. These modes are not persistent and will revert to normal, non-programmable operation on the next reset. A reset using $\overline{RESET}$ on $\overline{RESET}$ line 54 must be done after powering up to initialize the write and read pointers 44, 24 and counters and the offset register 36.

WCLK

The write clock signal WCLK on WCLK line 26 registers the data on D8–D0 of input data bus 14 into the input register 16 on its rising edge when the write enable(s) ($\overline{WEN1}$ and WEN2) are asserted, and (in normal operation) when $\overline{FF}$ on $\overline{FF}$ line 68 is high. In the alternate mode of operation, writing is possible even when $\overline{FF}$ on $\overline{FF}$ line 68 is low. The write clock (WCLK) is normally 50% duty cycle, and can be asynchronous or coincident with RCLK on RCLK line 46. If the separation between the two clocks is less than the specified skew, flag assertion/de-assertion will be delayed an extra cycle.

$\overline{WEN}$

When $\overline{WEN1}$ is low on $\overline{WEN1}$ line 28 and WEN2/$\overline{LD}$ is high (non-programmable mode), data is written into the input register 16 on every rising edge of WCLK on WCLK line 26, as long as the FIFO 10 is not full (in normal operation). If the FIFO 10 is set up in a programmable flag mode, then when $\overline{WEN1}$ is low and WEN2/$\overline{LD}$ is low, data is written into the offset register 36. In the alternative mode, the state of $\overline{FF}$ on $\overline{FF}$ line 68 does not affect the ability to write to the input register 16.

WEN2/$\overline{LD}$

WEN2/$\overline{LD}$ is a dual-purpose input on WEN2/$\overline{LD}$ line 30. If it is high when $\overline{RESET}$ goes low on $\overline{RESET}$ line 54, then this input operates as a second write enable, and must be high to write data into the FIFO 10. If this input is low when $\overline{RESET}$ goes low, then this input is operated as a control for loading or reading the offset register 36 for the programmable flags. If configured this way, when WEN2/$\overline{LD}$ goes low, the offset register 36 can be written to if $\overline{WEN1}$ on $\overline{WEN1}$ line 28 is low, or read from if both $\overline{REN1}$ on $\overline{REN1}$/$\overline{PRS}$ line 48 (in normal mode) and $\overline{REN2}$ on $\overline{REN2}$ line 50 are low.

Q8–Q0

The 9 bits of data from the location pointed to by the read pointer 44 is output to the output register 18 on the rising edge of the read clock on RCLK line 46 when the read enable(s) are asserted, and the FIFO 10 is not empty (in normal operation). The data becomes available to the output data bus 64 when $\overline{OE}$ on $\overline{OE}$ line 62 is low. The first word written into an empty FIFO 10 can be read out on the first rising edge of RCLK after $\overline{EF}$ goes high on $\overline{EF}$ line 66 (in normal operation). In the alternate mode, the state of $\overline{EF}$ does not affect the ability to read data into the output register 18. In the programmable mode, when WEN2/$\overline{LD}$ on WEN2/$\overline{LD}$ line 30 and the read enable(s) are low, the values stored in the offset register 36 are output on successive rising edges of RCLK to output data bus 64. When $\overline{OE}$ is high, Q8–Q0 on output data bus 64 are high-impedance, or three-state.

RCLK

Data is read into the output register 18 from the memory array 12 at the location pointed to by the read pointer 44 on the rising edge of RCLK on RCLK line 46 when the read enable(s) are low, and the FIFO 10 is not empty (in normal operation). In the alternate mode of operation, the state of $\overline{EF}$ on $\overline{EF}$ line 68 does not affect the ability to read. RCLK on RCLK line 46 is nominally 50% duty cycle, and can be asynchronous or coincident with WCLK on WCLK line 26. If the separation between the two clocks is less than the specified skew, flag assertion/de-assertion will be delayed an extra cycle.

$\overline{REN1}$/$\overline{PRS}$ $\overline{REN1}$/$\overline{PRS}$ line 48 is a dual-purpose input. In normal operation, $\overline{REN1}$ is a second read enable, and must be low to be able to read data out of the FIFO 10. If $\overline{REN1}$ is low when $\overline{RESET}$ on $\overline{RESET}$ line 54 goes low, then the FIFO 10 is put into its alternate mode of operation where the inhibiting effect of the flags is disabled. This input then becomes $\overline{PRS}$, a pointer reset with the same timing as $\overline{RESET}$, which when taken low, resets both the write and read pointers 24, 44 and counters to their initial state, sets $\overline{EF}$ on $\overline{EF}$ line 66 and $\overline{PAE}$ on $\overline{PAE}$ line 70 to low, and sets $\overline{FF}$ on $\overline{FF}$ line and $\overline{PAF}$ on $\overline{PAF}$ line 72 to high, but does not affect the offset values in offset register 76 or output register 18 as $\overline{RESET}$ would.

$\overline{REN2}$

When $\overline{REN2}$ on $\overline{REN2}$ line 50 is low, the reading of data from the memory array 12 to the output register 18 is enabled from the location pointed to by the read pointer 44 on the rising edge of RCLK on RCLK line 46, if $\overline{REN1}$ is also low on $\overline{REN1}/\overline{PRS}$ line 48 (in normal operation) and the FIFO 10 is not empty (in normal operation). The data in the output register 18 is output to the output data bus 64 when $\overline{OE}$ on $\overline{OE}$ line 62 is low. When the FIFO 10 is in the programmable mode and $\overline{WEN2}/\overline{LD}$ on $\overline{WEN2}/\overline{LD}$ line 30 is low, data is output to output data bus 64 when $\overline{REN1}$ is low (in normal operation) and $\overline{REN2}$ is low. In the alternate mode of operation, the state of $\overline{EF}$ on $\overline{EF}$ line 66 does not affect the ability to read from the FIFO 10.

$\overline{OE}$

When $\overline{OE}$ on $\overline{OE}$ line 62 is low, the data output pins, Q8–Q0 of output data bus 64, are active. When $\overline{OE}$ is high, the data output pins of output dta bus 64 are high-impedance or three-state.

$\overline{EF}$

When $\overline{EF}$ on $\overline{EF}$ line 66 goes low, it indicates that the read and write cycle counts are equal. The assertion and de-assertion of $\overline{EF}$ is synchronized to the rising edge of RCLK on RCLK line 46. In normal operation, if $\overline{EF}$ is low, reading from the FIFO 10 is inhibited. In the alternate mode of operation, the state of $\overline{EF}$ does not affect the ability to read data out of the FIFO 10.

$\overline{PAE}$

When $\overline{PAE}$ on $\overline{PAE}$ line 70 is low, the difference between the read and write cycle counts is less than the offset programmed into the offset register 36. If no offset has been stored, the default value for assertion is empty+7. The assertion and de-assertion of $\overline{PAE}$ is synchronized to the rising edge of RCLK on RCLK line 46.

$\overline{PAF}$

When $\overline{PAF}$ is low, the difference between the read and write cycle counts is greater than the maximum value minus the offset programmed into the offset register 36. If no offset has been stored, the default value for assertion is full−7, where full is the size of the FIFO 10 memory array 12. The assertion and de-assertion of $\overline{PAF}$ is synchronized to the rising edge of WCLK on WCLK line 26.

$\overline{FF}$

When $\overline{FF}$ on $\overline{FF}$ line 68 goes low, it indicates that the read and write cycle counts are separated by a value equal to the size of the FIFO 10 memory array 12. The assertion and de-assertion of $\overline{FF}$ is synchronized to the rising edge of WCLK on WCLK line 26. In normal operation, if $\overline{FF}$ is low, writing to the FIFO 10 is inhibited. In the alternate mode of operation, the state of $\overline{FF}$ does not affect the ability to write data into the input register 16.

VCC

One pin (not shown) is provided for a +5.0 ±0.5 power supply. This pin should be properly by-passed to ground with both a bulk capacitance and a high-frequency, low-inductance capacitance, and connected to a voltage supply plane for good noise immunity.

GND

One pin (not shown) is provided for the supply return at 0 volts. This pin should be connected to a ground return plane for good noise immunity.

The core of the FIFO 10 is a dual-ported CMOS RAM memory array 12 with associated write and read pointers 24, 44 that are ring counters that keep track of the memory location to be written to or read from within memory array 12. The write and read pointers 24, 44 are independently incremented by the rising edges of the write and read clocks appearing respectively on WCLK line 26 and RCLK line 46 when the appropriate write or read enables are asserted. Writing and reading can be done simultaneously, although for proper flag operation, the skew time specifications between the write and read clocks must be observed. The data is input to FIFO 10 on a nine-bit input data bus 14 and is clocked into the input register 16 on the rising edge of write clock appearing on WCLK line 26 and then transferred to the memory location of memory array 12 pointed to by the write pointer 24, which is incremented after each write cycle. When loading the offset values of the programmable almost empty flag and programmable almost full flag, the input data bus 14 is directed to the offset register 36 instead of the input register 16, and the almost empty and almost full offset values are loaded in four successive write clock cycles. Data loaded into memory array 12 is available for reading with the data first clocked into the output register 18 and then to the output data bus 64 on the next clock cycle. The first data written after FIFO 10 is empty is available on the first rising edge of the RCLK signal on RCLK line 46 after the signal on $\overline{EF}$ line 66 goes high. Each rising edge of the read clock then outputs the data from the memory locations of memory array 12 in succession, incrementing the read pointer 44 after each read cycle. The write control logic 22 and read control logic 42 determine which operations take place. The output buffer 60 goes three-state when signal on $\overline{OE}$ line 62 is high to permit wire-ORing.

The flag logic 34 controls the assertion of the full, empty and programmable almost full and programmable almost empty flags appearing respectively on $\overline{EF}$ line 66, $\overline{FF}$ line 68, $\overline{PAE}$ line 70, $\overline{PAF}$ line 72. These flags are controlled by separate write cycle and read cycle counters which keep track of how many cycles of each have occurred. When the write cycle count and the read cycle count are equal, the empty flag is asserted on $\overline{EF}$ line 66. When the write cycle count exceeds the read cycle count by the size of the memory array 12 of FIFO 10, then the full flag is asserted on $\overline{FF}$ line 68. The almost empty flag asserts when the write cycle count is less than the almost empty offset ahead of the read cycle count. The almost full flag asserts when the difference between the write cycle count and the read cycle count is greater than the size of the FIFO 10 minus the almost full offset.

In a normal mode of operation for FIFO 10, when the memory array 12 is empty, reads are inhibited. When the memory array of FIFO 10 is full, writes are inhibited. These inhibits may be disabled by selecting the alternate mode of operation during a reset, where the writing to, and reading from FIFO 10 are not inhibited by full or empty status as indicated by the flags appearing on $\overline{FF}$ line 68 and $\overline{EF}$ line 66. As will be more fully described hereinafter, this mode is useful when it is desired to read only a portion of the contents of FIFO 10 and modify the contents with new input data prior to reading out the entire contents.

Multiple write and read enables are provided to give flexibility and device selection, particularly when the devices are in a width or length expansion mode. One of the write enables is also used to load the offset register 36 and one of the read enables is used to put FIFO 10 into its alternate mode of operation.

The input register 16 receives the data from the input data bus 14 on the rising edge of the write clock. It is unable to receive data when the signal on $\overline{\text{WEN1}}$ line 28 is low and WEN2/$\overline{\text{LD}}$ appearing on WEN2/$\overline{\text{LD}}$ line 30 is high (in non-programmable mode) and when the signal on $\overline{\text{FF}}$ line 68 is high (in normal mode). The data is then forwarded to the memory array 12 at the location specified by the write pointer 24. The output register 18 receives the data from the memory array 12 on the rising edge of the read clock from the memory location specified by the read pointer 44. It is unable to receive data from memory when the signal $\overline{\text{REN1}}$ on $\overline{\text{REN1}}$/$\overline{\text{PRS}}$ line 48 is low (in normal mode) and signal $\overline{\text{REN2}}$ on $\overline{\text{REN2}}$ line 50 is low and when the $\overline{\text{EF}}$ signal on $\overline{\text{EF}}$ line 66 is high (in normal mode). For the first data written when the memory array 12 of FIFO 10 is empty, the data is available on the first rising edge of RCLK appearing on RCLK line 46 after the signal on $\overline{\text{EF}}$ line 66 goes high, and is output when the signal on $\overline{\text{OE}}$ line 62 is low. A $\overline{\text{RESET}}$ to $\overline{\text{RESET}}$ line 54 sets the output register 18 to all zeroes, while a pointer reset on $\overline{\text{REN1}}$/$\overline{\text{PRS}}$ line 48 does not (in alternate mode).

The offset register 36 stores the offset values used by the programmable almost empty and almost full flags of flag logic 34. The programmable mode is selected if the signal on WEN2/$\overline{\text{LD}}$ line 30 is low when signal the $\overline{\text{RESET}}$ on $\overline{\text{RESET}}$ line 54 also goes low. If not selected or not loaded, the offsets default to "7." In the programmable mode, the offset values will be set when both WEN2/$\overline{\text{LD}}$ and the signal on $\overline{\text{WEN1}}$ line 28 are low, which allows the data on the input data bus 14 (D8 is not used), to be clocked into the offset register 36 on four successive rising edges of the signal on WCLK line 26. In the programmable mode, the data stored in the offset register 36 can be read out to the output data bus 64 (Q8 is not used) on four successive rising edges of the signal on RCLK line 46 when WEN2/$\overline{\text{LD}}$ is low and both the signal on $\overline{\text{REN1}}$/$\overline{\text{PRS}}$ line 48 (in the normal mode) and $\overline{\text{REN2}}$ line 50 are low and the signal on $\overline{\text{OE}}$ line 62 is low. The low order bits of the empty offset are loaded and read-first followed by the higher order bits, if any, on the next cycle with the low order bits of the full offset on the third cycle and the higher order bits, if any, on the fourth cycle. The cycles then repeat in the same order as long as there are rising clock edges and signal WEN2/$\overline{\text{LD}}$ is low. The offset loading or reading cycles can be interrupted by taking the signal WEN2/$\overline{\text{LD}}$ high which will return the FIFO 10 to writing or reading to memory array 12, but will resume writing or reading to the offset register 36 where it left off when WEN2/$\overline{\text{LD}}$ is taken low again. The values stored in the offset register 36 will be reset at the signal when $\overline{\text{RESET}}$ line 54 goes low (but not if the pointer reset signal ($\overline{\text{PRS}}$) goes low and in alternate mode) or they are reloaded by taking both the signals on $\overline{\text{WEN1}}$ line 28 and the signal WEN2/$\overline{\text{LD}}$ low and rewriting the values.

There are four flags available to the user to signal the internal status of the FIFO 10, the full flag appearing on $\overline{\text{FF}}$ line 68, the empty flag appearing on $\overline{\text{EF}}$ line 66, the programmable almost full flag appearing on $\overline{\text{PAF}}$ line 72 and the programmable almost empty flag appearing on $\overline{\text{PAE}}$ line 70. The full flag signal on $\overline{\text{FF}}$ line 68 goes low when the read pointer 44 and the write pointer 24 are separated by distance equal to the size of the memory array 12 of the FIFO 10. In normal operation, when the signal on $\overline{\text{FF}}$ line 68 goes low, further writes are inhibited until at least one read cycle has occurred. The empty flag signal appearing on $\overline{\text{EF}}$ line 66 goes low when the read pointer 44 and the write pointer 24 are at the same memory location. In normal operation, when signal on $\overline{\text{EF}}$ line 66 goes low, further reads are inhibited until at least one write cycle has occurred.

In the alternate mode of operation, the flag assertion does not inhibit the ability to read or write, which permits overwriting the contents of memory array 12 before they are read. In this alternate mode, the user is responsible for deciding the meaning of full or empty flags because a flag assertion only indicates the difference between the write and read counters, which is now separate from the location of the write and read pointers 24, 44.

If the programmable almost empty flag and programmable almost full flags are not programmed, the value at which the almost empty flag will go low on $\overline{\text{PAE}}$ line 70 is "empty+7," meaning there are 7 locations left to be read (without a write) before the empty flag will go low, and the value at which the almost full flag on $\overline{\text{PAF}}$ line 72 will go low is "full−7," meaning there are 7 locations left to be written (without a read) before the full flag will go low. At the next reset signal appearing on $\overline{\text{RESET}}$ line 54, the offsets in offset register 36 will return to their default value, and the FIFO 10 will return to the non-programmable operation unless the signal WEN2/$\overline{\text{LD}}$ is held low when the signal on reset line 54 goes low.

The alternate mode of operation for FIFO 10 is selected when the signal $\overline{\text{REN1}}$ on $\overline{\text{REN1}}$/$\overline{\text{PRS}}$ line 48 is low and the signal on $\overline{\text{RESET}}$ line 54 goes low. In this mode of operation, the flags will assert, but the assertion of the full flag will not inhibit further write cycles to the memory array 12 of the FIFO 10, but will overwrite the data previously written. Also, the assertion of the empty flag appearing on $\overline{\text{EF}}$ line 66 will not inhibit further read cycles from the memory array 12 of the FIFO 10, but will re-read previously-stored data. This is of use when the contents of the FIFO 10 need to be altered prior to being read out. As will be more fully described hereinafter, in an ATM application, the first five bytes, for example, written into the memory array 12 of the FIFO 10 are read out, and then possibly re-written prior to the contents of the FIFO 10 being read out in its entirety. This can be easily accomplished by setting the FIFO 10 into the alternate mode, and using the pointer reset $\overline{\text{PRS}}$ to return the write and read pointers 24, 44 to the starting location without effecting any programmed offset values in offset register 36. To remain in the alternate mode, the $\overline{\text{REN1}}$ signal appearing on $\overline{\text{REN1}}$/$\overline{\text{PRS}}$ line 48 must be held low when a logic low reset signal is applied to $\overline{\text{RESET}}$ line 54.

Upon power up, FIFO 10 will normally come up in the non-programmable mode of operation (rather than the programmable flag mode) and in normal mode (rather than the alternate mode). An initial FIFO 10 reset, effectuated by asserting a logic low level on RESET line 54, will set the write pointer 24 and read pointer 44 to the first location in memory array 12, reset the write and read cycle counters, set the signal on $\overline{EF}$ line 66 and $\overline{PAE}$ line 70 low, set the signal on $\overline{FF}$ line 68 and $\overline{PAF}$ 72 high, set the output register 18 to all zeroes, and set the offset register 36 to its default value of "7."

To set FIFO 10 into the programmable flag mode of operation, the signal WEN2/$\overline{LD}$ is held low while applying a logic low signal to $\overline{RESET}$ line 54. The flag offsets can then be loaded as previously discussed. The next logic low signal applied to $\overline{RESET}$ line 54 will restore the default values of the offsets, and if the signal WEN2/$\overline{LD}$ is high during the next reset, FIFO 10 will be returned to the non-programmed mode.

To set FIFO 10 into the alternate mode of operation, which disables the inhibiting action of the full and empty flags on the writing and reading ability, the $\overline{REN1}$ signal on $\overline{REN1/PRS}$ line 48 is held low while taking the signal on $\overline{RESET}$ line 54 low. In order to remain in the alternate mode of operation, the $\overline{REN1}$ signal on $\overline{REN1/PRS}$ line 48 must be held low during any reset.

A read cycle occurs when both the $\overline{REN1}$ signal on $\overline{REN1/PRS}$ line 48 (in normal mode) and $\overline{REN2}$ line 50 are low. On the rising edge of the signal on RCLK line 46, the data at the memory location of memory array 12 pointed to by the read pointer 44 is loaded into the output register 18. The data is output to the output data bus 64 if the signal on $\overline{OE}$ line 62 is low. A constant stream of data can be read from the memory array 12 on each rising edge of the signal RCLK with the read pointer 44 and read cycle counter incremented after each cycle. If FIFO 10 is in the programmable mode and the signal WEN2/$\overline{LD}$ is low, then the data output on output data bus 64 is from the offset register 36. Read cycles occur independently of write cycles, other than the flag inhibiting action in the normal mode of operation.

A write cycle occurs when the signal on $\overline{WEN1}$ line 28 is low and the signal WEN2/$\overline{LD}$ is high (in non-programmable mode) on a rising edge of the signal on WCLK line 26, and if FIFO 10 is not full (in normal mode). In this case, the data on input data bus 14 will be registered into the input register 16, and from there transferred to the location in memory array 12 pointed to by the write pointer 24. A constant stream of data can be written to memory array 12 on succeeding rising edges of the signal on WCLK line 26 with the write pointer 24 and write cycle counter incremented after each cycle. If, in the programmable mode of operation, the signal WEN2/$\overline{LD}$ is low when the signal on $\overline{WEN1}$ line 28 goes low, then the data on input data bus 14 will be loaded into the offset register 36 on the succeeding rising edges of the signal on WCLK line 26. In the alternate mode of operation of FIFO 10, the state of the signal on $\overline{FF}$ line 68 does not effect the ability to write into the input register 16. Write cycles occur independently of read cycles, other than the flag inhibiting action in the normal mode.

A reset cycle occurs when the signal on $\overline{RESET}$ line 54 is taken low. When a reset is issued, the write and read pointers 24, 44 are returned to the first location in memory array 12, the output register 18 is set to all zeroes, the write and read cycle counters are reset, which sets the empty and almost empty flags low and the full and almost full flags high. The offset register 36 is set to its default values, and unless the signal WEN2/$\overline{LD}$ is held low during the reset, the device returns to its non-programmable mode of operation, and unless the signal on $\overline{REN1/PRS}$ line 48 is held low during the reset, FIFO 10 returns to its normal mode of operation. A reset should be performed immediately after power up to set FIFO 10 into a known state.

When FIFO 10 is empty, the first data written to memory array 12 is registered into the input register 16 and then flows into the location in memory pointed to by the write pointer 24. When FIFO 10 is empty, the data just stored will be available for read out on the next rising edge of the signal appearing on RCLK line 46 after the one that takes the signal on $\overline{EF}$ line 66 high. It then will be read out to the output data bus 64 when signal on $\overline{OE}$ line 62 is low.

Figure 2:
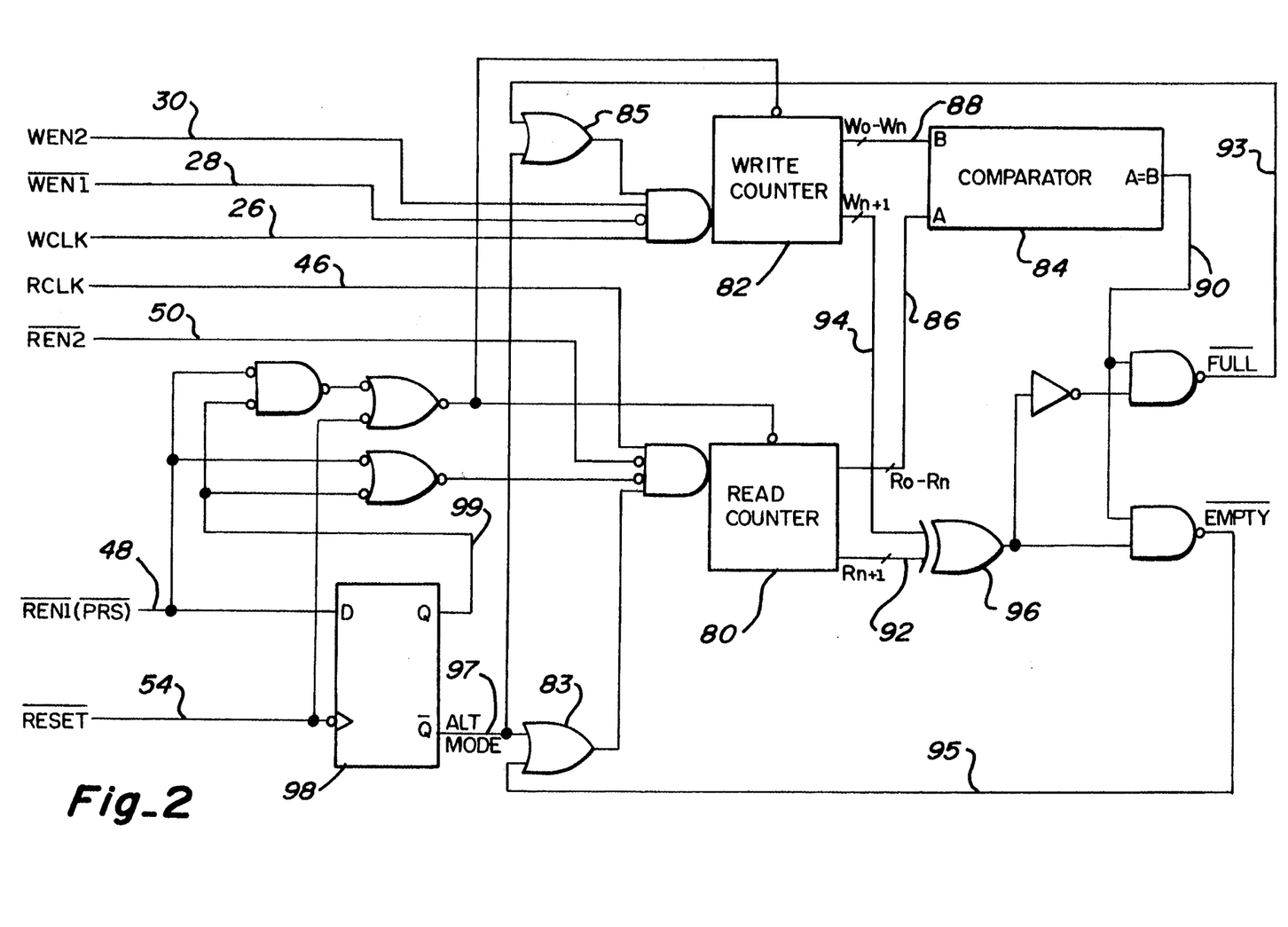
FIG. 2 is a simplified, logic block diagram of the control logic for the FIFO of FIG. 1, showing how the alternate mode of operation is implemented, in order that the inhibiting function of the full and empty flags is defeated to provide an alterable buffer store and further showing how the pointer reset is implemented as part of the alternate mode of operation.

With reference to FIG. 2, the FIFO 10 is a dual-ported memory device with separate read and write pointer registers (not shown) which address the memory entry being written to or read from, along with a separate read counter 80 and write counter 82 which are used to derive the empty and full flags. Both read and write counters 80,82 are implemented using binary counters having one bit more that the power of two of the FIFO 10 depth. For example, a FIFO 10 having 2048 entries would have a read counter 80 and a write counter 12 bits wide. The lower 11 bits of each such counter are fed to a comparator 84 which compares each bit of the A input 86 with the corresponding bit of the B input 88 and outputs a signal on A=B line 90 when those bits have equal values, meaning that the number of read cycles is equal to the number of write cycles. At this point, the FIFO 10 is either empty or full, depending on the value of the 12th bits of the read counter 80 and write counter 82 appearing on lines 92 and 94, respectively, which are fed to an exclusive-OR gate 96. If they are of equal value, the FIFO 10 is empty. If they are different, the FIFO 10 is full.

In normal operation, if the FIFO 10 is empty, read cycles are inhibited and write cycles are enabled. If the FIFO 10 is full, write cycles are inhibited and read cycles are enabled. If the FIFO 10 is neither empty nor full, both read and write cycles are enabled. For the alternate mode of operation, read and write cycles are enabled all the time, so that the contents of the FIFO 10 can be altered irrespective of the number of read or write cycles. To implement this, a setup procedure is invoked at the time the FIFO 10 is reset. When the signal on $\overline{RESET}$ line 54 is taken low, if the signal on $\overline{REN1(PRS)}$ line 48 is high, the D-type flip-flop 98 Q output 99 goes high, and the $\overline{Q}$ output 97 goes low, inhibiting the alternate mode of operation by allowing the $\overline{EMPTY}$ and $\overline{FULL}$ signals 95,93 to pass through to the read and write counters 80,82 respectively, using the OR gates 83,85 shown. If the $\overline{EMPTY}$ signal 95 is low, the read counter 80 will then be inhibited by the $\overline{EMPTY}$ signal 95. If the $\overline{FULL}$ signal 93 is low, the write counter 82 will be inhibited by the $\overline{FULL}$ signal 93. Also, the $\overline{REN1(PRS)}$ signal 48 will be inhibited from serving as a reset to the read and write counters 80,82 by another negative OR gate, but instead functions as an additional read enable signal to the read counter 80.

If the signal on $\overline{REN1(PRS)}$ line 48 is low when the $\overline{RESET}$ signal is taken low during setup, then the D-type flip-flop 98 Q output 99 goes low, and the $\overline{Q}$ output goes high, setting the FIFO 10 into its alternate mode of operation. In this case, the $\overline{EMPTY}$ and $\overline{FULL}$ signals 95,93 are prevented from passing through to the read and write counters 80,82 by the OR gates so that read cycles and write cycles are allowed to continue incrementing the read and write counters 80,82 irrespective of the number of previous read and write cycles. This allows the FIFO 10 to function as an alterable buffer store because previously stored information can be read out, re-written, and read out again with new contents. Also, when the alternate mode of operation is set, the signal on $\overline{REN1(PRS)}$ line 48 is inhibited from funtioning as a read enable signal to the read counter 80 by a negative AND gate, but functions as a separate reset to the read and write counters 80,82 and the read and write pointer registers (not shown). As opposed to the signal on $\overline{RESET}$ line 54, this $\overline{PRS}$ signal does not reset the D-type flip-flop 98 that determines whether the FIFO 10 is in alternate or normal mode of operation, nor does it reset the flag offset registers used to implement the programmable almost empty and almost full flags (not shown). Thus, the alterable buffer store function is facilitated by using the $\overline{PRS}$ signal as a reset, because the setup of the FIFO 10 is not effected as it would be by using the signal on $\overline{RESET}$ line 54.

Figure 3:
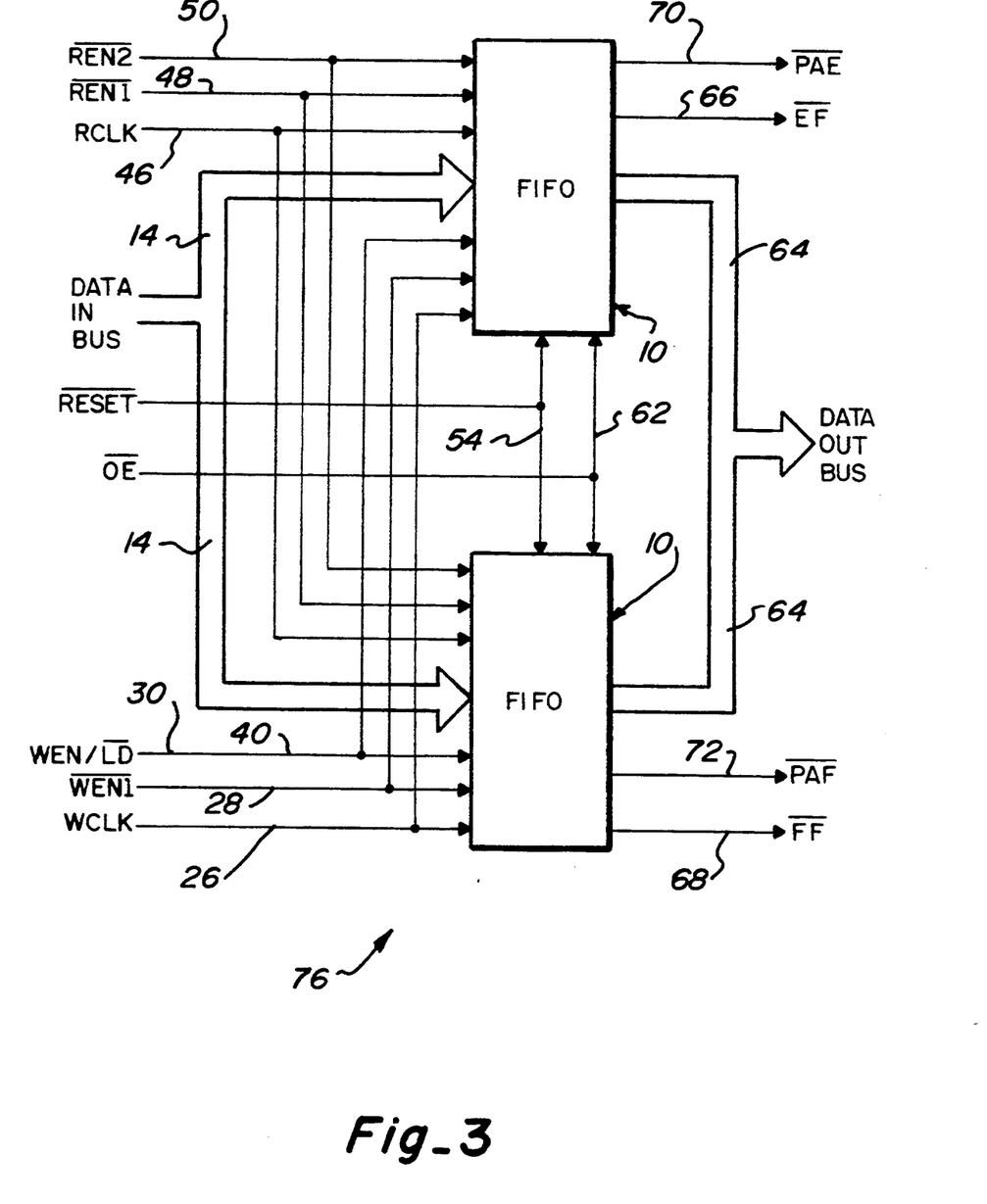
FIG. 3 is a simplified, logic block diagram of the synchronous FIFO of FIG. 1 in which the data input bus and data output bus may be expanded in width in certain applications.

With reference now to FIG. 3, an expanded width FIFO 76 is shown. Expanded width FIFO 76 incorporates two FIFOs 10 as previously described with respect to FIG. 1. Further, with respect to expanded width FIFO 76 as illustrated in FIG. 3, like structure to that above-described with respect to FIG. 1 is like numbered, and the foregoing description thereof shall suffice herefor.

In the example shown in FIG. 3, two input data buses 14 may be combined to a width of 18 bits or to any multiples of 8 or 9 as may be required. Utilizing the dual write and read enable signals of FIFO 10, along with separate count down clocks, data from an 8 or 9 bit bus can be stored in whatever width desired, and then re-interleaved back into an 8 or 9 bit format on output data buses 64 to allow the use of slower FIFO's 10 on fast data buses.

Figure 4:
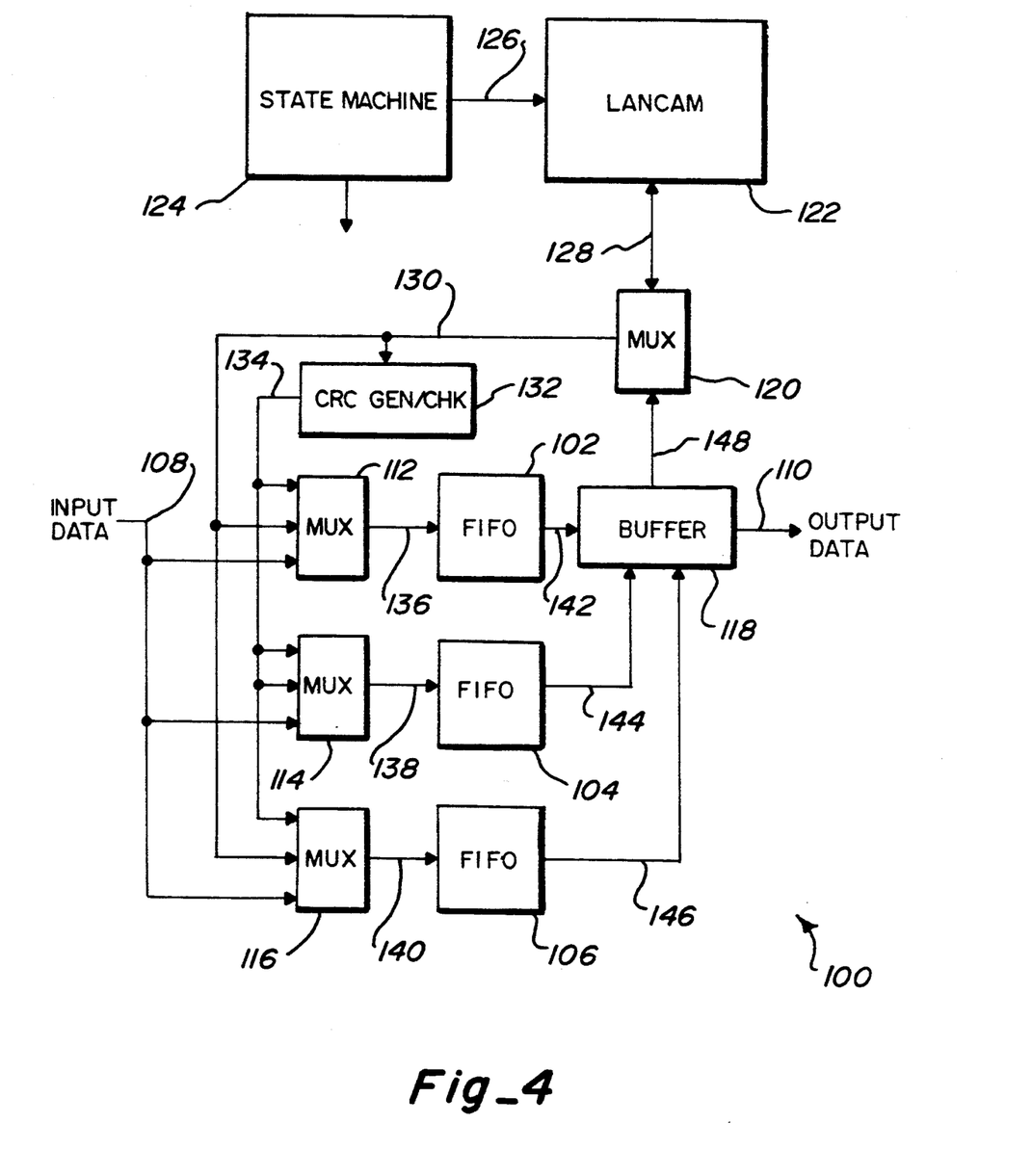
FIG. 4 is a simplified, logic block diagram of a data switching system incorporating three of the FIFOs of FIG. 1 operating in their alternate mode of operation in an ATM header processing system.

With reference now to FIG. 4, an ATM FIFO 100 is shown. ATM FIFO 100 incorporates a number of FIFO's which have been previously described with respect to the embodiments of FIGS. 1 and 3. ATM FIFO 100 comprises, in pertinent part, a first FIFO 102, second FIFO 104 and third FIFO 106 having their outputs applied to buffer 118 on respective output buses 142, 144 and 146. Output of buffer 118 is supplied on output data bus 110 and bus 148 to multiplexer 120.

Multiplexer 120 communicates with local area network content addressable memory ("LANCAM") 122 by means of LANCAM bus 128. LANCAM 122 is driven by state machine 124 through state machine output 126 as will be more fully described hereinafter. Multiplexer 120 also provides an output on internal data bus 130 for input to cyclical redundancy check ("CRC") generator/check circuit 132. The output of CRC generator/check circuit 132 appearing on CRC data bus 134, in conjunction with internal data bus 130 comprise a modification data bus for input to multiplexers 112, 114 and 116 for respective input to first FIFO 102, second FIFO 104 and third FIFO 106 on input buses 136, 138 and 140 respectively. An additional input to multiplexers 112, 114 and 116 is supplied on input data bus 108 as shown.

The data switching system comprising ATM FIFO 100 shown in FIG. 4 is a cell-switching technology which will allow voice, video and data communication by the use, for example, of 53 byte interleaved cells. The first 5 bytes comprise the cell header which contain address information along with an 8 bit CRC code. These cells are combined into frames of varying formats and lengths depending upon the physical transmission system. Presently, CCITT calls for ATM frequencies of 155 Mbps and 622 Mbps. Specifications have been generated to cover SONET at 155.52 Mbps, DS-3 at 44,736 Mbps, 100 Mbps (FDDI-like) and 155.52 Mbps (FDDI-like). The 622 Mbps service is currently not defined. Present implementation at 155.52 Mbps (19.44 Mbps), results in a 51.44 ns byte clock, or a 102.88 ns 16-bit word clock. Current research and development work at 622.08 Mbps would use a 12.86 ns byte clock, or a 25.72 ns 16-bit word clock.

In an ATM switch comprising ATM FIFO 100, the header address may need to be replaced by a new value corresponding to the next hop in the network, requiring verification of the CRC value, compares on 24 or 28 bits of data, the substitution of a new address value, and recalculation of the CRC value within the cell time in order to operate on something approaching "real time." A representative ATM header processing system comprising ATM FIFO 100 that will function up to 155 Mbps "real time" is shown in FIG. 4 and uses a series of FIFOs 10 as previously described with respect to FIGS. 1 and 3, operating in their alternate mode. LANCAM 122 may be conveniently supplied as a MUSIC Semiconductors, Inc. MU9C1480 device which performs the compare operation against a stored data base and outputs the new address value to be inserted in the cell.

The alternate mode of operation for the FIFOs 10 previously described, allows the cell header to be overwritten prior to being read out to its destination. In this mode, the inhibiting function of the full and empty flags is disabled to allow the user total control and responsibility over the data in the FIFO 10 memory. Extending the system to handle 622 Mbps can be done by increasing the width of each FIFO 10 as described with respect to expanded width FIFO 76 of FIG. 3.

In operation, ATM FIFO 100 functions such that while one of first, second or third FIFO's 102, 104, 106 FIFO is receiving input data, another is processing the header, while a third is reading the modified cell out to the destination. This can be accomplished with only a two-cell delay using this approach, rather than a frame delay if the entire frame were stored and then processed. This can be accomplished with the alternate mode of operation where the write and read pointers can be incremented and reset without inhibiting the ability to write or read as happens under normal FIFO operation.

With respect to the embodiment shown in FIG. 4, while first FIFO 102 is writing in one 53 bit cell, second FIFO 104 is reading out the first five bytes of the cell, where the first four bytes go to the LANCAM 122 for a compare operation, while all five bytes go to the CRC generator/check circuit for verification. At this point, the read and write pointers of the second FIFO 104 are reset to zero. Assuming the CRC generator/check circuit 132 verifies the header integrity, and the LANCAM 122 finds a valid match in its database, the LANCAM 122 outputs a new four byte address value which overwrites the first four bytes of the header, and then the CRC generator/check circuit 132 provides the fifth byte, a new CRC code, to overwrite the old value. At this point, the read and write pointers of second FIFO 104 are reset to zero in preparation for reading out the modified cell, and one read clock is issued to load the first byte into the output register of second FIFO 104. If there is not a match, then the header is not rewritten, and the cell is not read out, but is overwritten in the next write cycle. Simultaneously, third FIFO 106 is reading out the entire 53 byte modified cell.

As the next cell comes in, the data on input data bus 108 is directed to the next FIFO in rotation which just completed reading out its modified cell, and the remaining FIFO becomes the device to read out its modified cell. Thus the second cycle is first FIFO 102 does the processing described with respect to second FIFO 104, second FIFO 104 is reading out the entire 53 byte modified cell, and third FIFO 106 is writing in a 53 byte cell.

The rotation is completed on the third cycle where first FIFO 102 is reading out the entire 53 byte modified cell, second FIFO 104 is writing in a 53 byte cell and third FIFO 106 does the processing above-described in the first cycle for second FIFO 104.

While there have been described above the principles of present invention in conjunction with specific apparatus, it is to be clearly understood that the foregoing description is made only by way of example and not as a limitation to the scope of the invention as described in the following claims.

What is claimed is:

1. A first-in first-out memory device including a memory array, said device having input and output registers thereof respectively coupling an input data bus and an output data bus of said device to said memory array, said device comprising:
    write control logic responsive to a write enable signal for transferring data on said input data bus to said input register for writing to a first predetermined location in said memory array;
    read control logic responsive to a read enable signal for transferring data from a second predetermined location in said memory array to said output register for reading on said output data bus;
    flag logic responsive to said write control logic and said read control logic for indicating when said memory array is full or empty;
    first means for inhibiting said write control logic and said read control logic in response to a respective full or empty indication from said flag logic; and
    second means for enabling said write control logic and said read control logic despite said respective full or empty indication from said flag logic.

2. A first-in first-out memory device having a memory array, said device including write control logic responsive to a write enable signal for transferring data on an input data bus to an input register for writing to a first predetermined location in said memory array and read control logic responsive to a read enable signal for transferring data from a second predetermined location in said memory array to an output register for reading on an output data bus, said device further including flag logic responsive to said write control logic and said read control logic for indicating when said memory array is full or empty, said write control logic and said read control logic being inhibited in response to a respective full or empty indication from said flag logic, the improvement comprising, in combination:
    means for enabling said write control logic and said read control logic despite said respective full or empty indication from said flag logic.

3. A data switching system coupled between an input data bus and an output data bus, said system including a plurality of memory devices in which data may be selectively modified in any of said devices comprising:
    a first memory device coupled to said input data bus for writing in input data to a first memory array;
    a second memory device coupled to a modification data bus for overwriting selected data in a second memory array with modified data substantially concurrently with the writing in of the input data to the first memory array of said first memory device; and
    a third memory device coupled to said output data bus for reading out output data from a third memory array to said output data bus substantially concurrently with the overwriting of the selected data in the second memory array of said second memory device.

4. The data switching system of claim 3 further comprising:
    a multiplexer system selectively coupling said input and modification data buses to said first, second and third memory devices, said multiplexer system coupling said input data bus and said modification data bus to said first and second memory devices respectively at a first predetermined time, to said third and first memory devices respectively at a second predetermined time and to said second and third memory devices respectively at a third predetermined time.

5. A data switching system coupled between an input data bus and an output data bus, said system including a plurality of memory devices in which data may be selectively modified in any of said devices comprising:
    means for writing in data from said input data bus to a first memory device;
    means for modifying data in a second memory device substantially concurrently with the writing in of the data from said input data base by said means for writing; and
    means for reading out data from a third memory device to said output data bus substantially concurrently with the modifying of the data in the second memory device by said means for modifying.

6. A method for data switching between an input data bus and an output data bus comprising the substantially concurrent steps of:
    writing in a first cell of data from said input data bus to a first memory device;
    modifying a second cell of data in a second memory device; and
    reading out a third cell of data from a third memory device to said output data bus.

7. The method of claim 6 further comprising the steps of:
    secondly modifying the first cell of data in said first memory device;
    secondly reading out the second cell of data from said second memory device once modified during said step of modifying to said output data bus; and
    secondly writing in a fourth cell of data from said input data bus to said third memory device.

8. The method of claim 7 further comprising the steps of:
    thirdly reading out the first cell of data from said first memory device once modified during said step of secondly modifying to said output data bus;
    thirdly writing in a fifth cell of data from said input data bus to said second memory device; and
    thirdly modifying the fourth cell of data in said third memory device.

* * * * *